Nov. 13, 1934.　　　M. A. ROBLEE　　　1,980,550
AUTOMOBILE
Filed June 6, 1932
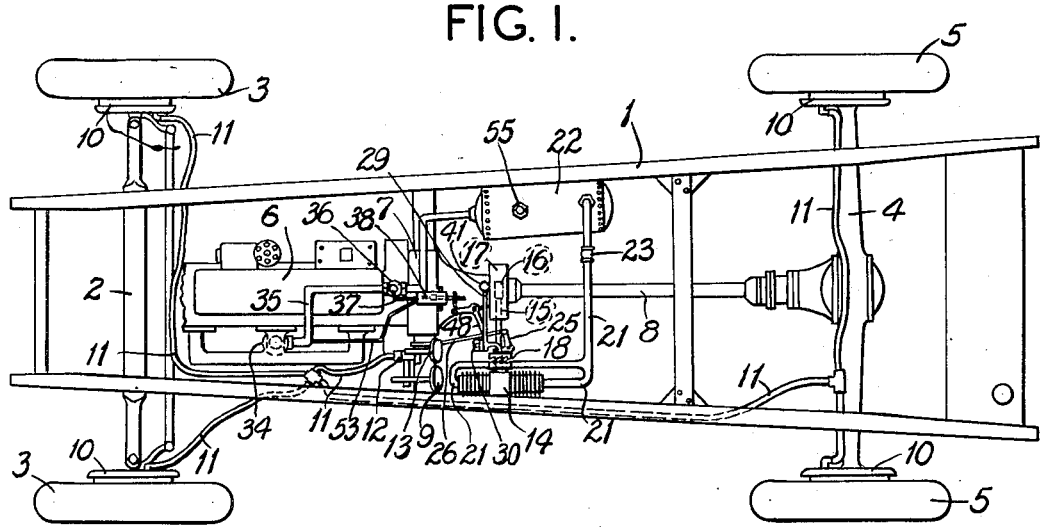
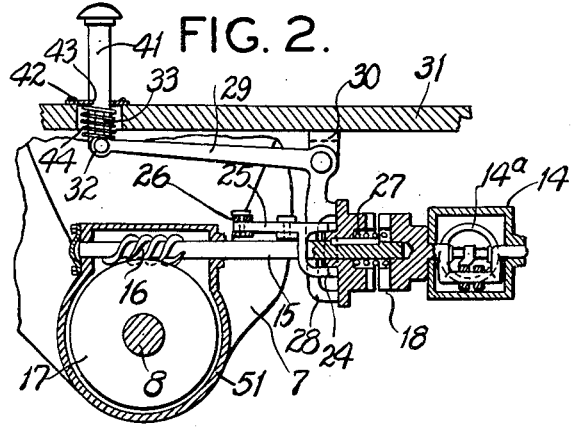
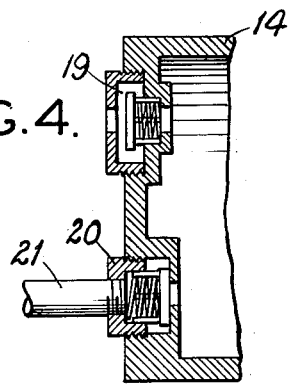
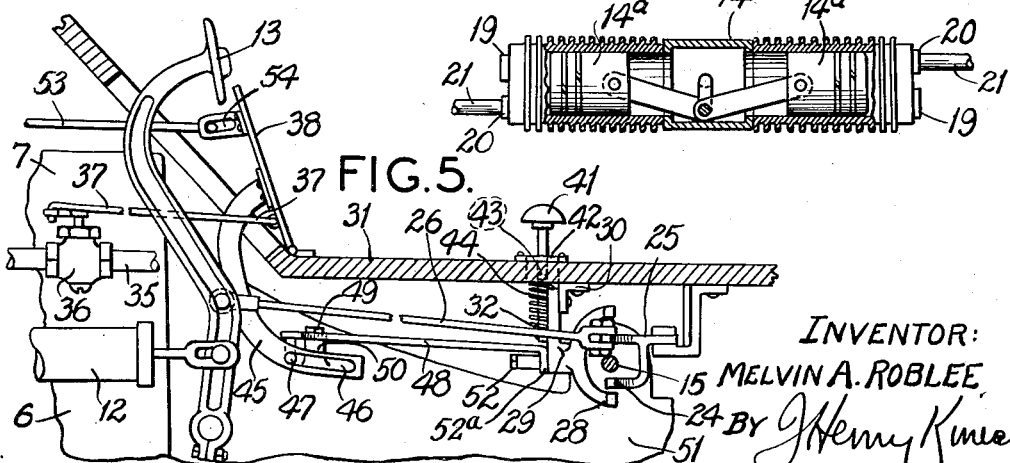
INVENTOR:
MELVIN A. ROBLEE.
BY J. Henry Kinsely
ATTORNEY Patented Nov. 13, 1934

1,980,550

UNITED STATES PATENT OFFICE 1,980,550

AUTOMOBILE

Melvin A. Roblee, Clayton, Mo.

Application June 6, 1932, Serial No. 615,500

4 Claims. (Cl. 123—119)

My invention relates to automobiles and more particularly to automobiles including an internal combustion motor to furnish the motive power therefor.

My invention in its broadest application has for its object to provide means whereby the momentum of the automobile, when it is not being actively driven by the motor and, therefore, when the speed of the automobile is being reduced, will generate energy or power which is used during subsequent acceleration of the automobile to increase the efficiency of the internal combustion engine.

In this specification by automobile I mean any self-propelled vehicle or conveyance whether it is used on land or water or in the air and without regard the size or arrangement of the various parts. Such an automobile embodying one form of my invention is shown in the accompanying drawing wherein Fig. 1 is a plan view of the automobile chassis; Fig. 2 is a section along the line 2—2 in Fig. 1 with certain parts added thereto; Fig. 3 is a section of the air compressor included as part of the device; Fig. 4 is a detail of the inlet and outlet valves of the compressor shown in Fig. 3; Fig. 5 is a diagrammatic showing of the control mechanism for the compressor.

Referring to the figures the automobile chassis shown therein has the usual frame 1 to which is attached the front axle 2 with its carried wheels 3 and the rear axle 4 with its wheels 5 to which motive power is applied. The internal combustion engine 6 has an operative connection with the wheels 5 through a clutch positioned in the housing 7, a drive shaft 8 and an internal axle shaft, not shown but included in the rear axle 4. The clutch between the motor 6 and propeller shaft 8 is operated in the usual manner by a clutch pedal 9. Each of the wheels 3 and 4 has a brake 10 operated, in this embodiment, by hydraulic force transmitted through pipes 11 and applied from a master cylinder 12 by depression of a brake pedal 13. The above described mechanism is of conventional design and, of course, I do not intend to limit myself to any particular design or parts.

Carried by the frame of the automobile in any suitable manner is an air compressor 14, here shown as being of the two cylinder reciprocating type, and this compressor may be operatively connected as hereinafter described to the propeller shaft 8 by means of the stub shaft 15, worm gear 16 and spur gear 17 fixed to the shaft 8. A clutch 18 is provided on the shaft 15 so that when the clutch is engaged and the automobile is in motion the pistons 14a will be reciprocated in the compressor cylinders. In this embodiment of my invention the clutch 18 has dual controls operated as explained below. When the compressor 14 is being driven by momentum of the car air entering the inlet valves 19 will be compressed and will flow outwardly through exhaust valves 20 and the exhaust duct 21 into a storage tank 22. I prefer that a check valve 23 be positioned in the duct 21 close to the tank 22 so that air may flow in one direction only therethrough. To prevent the building up of too great a pressure in the tank 22 a safety valve 55 may be provided.

The parts of the clutch 18 are moved into engagement to complete the operative connection from the propeller shaft 8 to the compressor 14 in one instance by a yoke 24 carried by the bell crank 25 connected by a rod 26 to the brake pedal 13 so that depression of this pedal will throw the clutch into engagement. The pedal 13 and the brake mechanism and compressor clutch control operated thereby may be arranged so that a partial depression of the pedal will throw the clutch 18 into operative engagement and further depression of the pedal is necessary to apply the brakes. When the pedal is released the parts of the clutch 18 are thrown out of engagement by the spring 27.

The second control of the clutch 18 is mainly dependent upon the position of the throttle or accelerator pedal 38. This control mechanism is shown particularly in Figs. 2 and 5 and consists of a yoke 28 in engagement with the movable part of the clutch 18 and positioned at the lower end of a bell crank 29 pivotally mounted on a bracket 30 carried by the floor board 31 of the front seat compartment of the automobile. At the opposite end of the bell crank 29 from the yoke 28 is a pin 32 extending through a slot 33 in the plunger 41 which extends upwardly through the floor board 31 so as to be within convenient reach of the operator of the automobile. The plunger 41 is held in raised position by a catch on the plate 42 which catch is adapted and arranged to engage a notch 43 in the plunger 41. When the plunger 41 is rocked to carry the notch out of engagement with the catch the plunger may be moved downwardly to allow the bell crank 29 to move to throw the parts of the clutch 18 into engagement. The movement of the bell crank 29 is effected by a spring 44 positioned between the pin 32 and the plate 42 and the spring 44 is slightly heavier than the spring 27 of the clutch 18 so that the resistance of the spring 27 will be overcome and the spring 44 will maintain the clutch parts in engagement as long as the plunger 41 is not held in the up position.

Carried by the accelerator pedal 38 is an arm 45 at the lower end of which is formed a slot 46 adapted to receive a lug 47 projecting from a bell crank 48 pivotally mounted on a pin 49 carried by a bracket 50 extending from the casing 51 in which the gears 16 and 17 are contained. The end of the bell crank 48 opposite the end carrying the lug 47 is attached by means of a bolt 52 or other suitable means to the yoke 28. When the bell crank 48 is moved the inner end 52a adjacent the yoke 28 will be moved away from the clutch 18 in a diagonal direction and, therefore, to translate this movement into the proper direction to move the yoke 28 the pin 52 extends out from the yoke through an enlarged opening in the end 52a. As the bell crank is moved the end 52a thereof will slide out along the pin 52 and the yoke will be moved away from the clutch. It will be seen that the depression of the accelerator pedal 38 to operate the throttle valve of the carburetor 34 through the rod 53 will move the bell crank lever 48 to carry the yoke 28 away from the clutch 18 and thereby allow the spring 27 to move the parts of the clutch 18 out of engagement. So that the clutch 18 will be disengaged by action of the accelerator pedal before the throttle valve is opened the rod 53 is preferably mounted in a slotted bracket 54 on the pedal 38 so that the pedal will move a sufficient distance to throw the clutch 18 out of engagement before the rod 53 is moved by further depression of the pedal.

Leading from the tank 22 to the carburetor 34 of the motor 6 is an air duct 35. Positioned on the air duct 35 is a valve 36 which is opened through movement of the link 37 when the throttle pedal 38 is depressed or otherwise moved to open the throttle valve of the carburetor, from its normal or idling closed position, as described above.

Having described this embodiment of my invention its operation is as follows: Ordinarily the plunger 41 is moved so that the catch on the plate 42 is out of engagement with the notch 43 so that the spring 44 acting through the bell crank 29 will hold the parts of the clutch 18 in operative engagement and thereby complete the operative connection between the propeller shaft 8 and the compressor 14 whereby the momentum of the automobile will operate the compressor to store compressed air in the tank 22. When the accelerator pedal 38 is depressed to accelerate the automobile movement of such pedal will open the valve 36 in the duct 35 so that compressed air will flow from the tank 22 where it has been stored, through said duct into the air inlet of the carburetor 34 to thereby increase the charge of fuel supplied to the cylinders of the motor and, in turn, increase the efficiency of the motor during the acceleration period. However, during such period of acceleration there should be no drag from the compressor 14 and, therefore, a movement of the accelerator pedal 38 to open the throttle valve of the carburetor and then open the valve 36 to allow air to flow through the carburetor also, as explained above, also moves the bell crank 48 to throw the parts of the clutch 18 out of engagement and thereby render the compressor inoperative. When the accelerator pedal 38 is released to close the throttle valve of the carburetor and the valve 36 in the duct 35, pressure on the bell crank 48 to hold the parts of the clutch 18 out of engagement will be released and the spring 44 will move the bell crank 29 to move the parts of the clutch back into engagement and an operative connection to the compressor will be re-established.

Under certain conditions it is desirable that the compressor 14 operate only when the brakes of the automobile are being applied to slow down or stop the car and under such condition the plunger 41 is moved to bring the notch 43 into engagement with the catch on the plate 42 and thereby hold the bell crank 29 in position to allow the parts of the clutch 18 to move out of engagement. An operative connection to the compressor will then be established only when the brake pedal 13 is depressed to move the bell crank 25 and its carried yoke 24 to move the parts of the clutch into engagement, as described above.

With either control it will be seen that the compressor 14 will be operatively active when the throttle valve is in its normal closed position and the speed of the car is to be reduced. This reduction of speed will be effected to some extent by the drag of the compressor 14 and for ordinary driving the brakes will not be used unless the car is to be brought to a stop. When the car is to be accelerated the compressor 14 always will be inoperative and there will be no drag from the compressor during such acceleration.

In the accompanying drawing and in the above description I have shown and described a simple device embodying my invention, but the parts and their arrangement may be changed in many ways without deviating from the spirit of my invention as included in the appended claims.

What I claim as new and desire to secure by Letters Patent, is:—

1. An automobile including an internal combustion motor, an air compressor adapted and arranged to be driven by the momentum of said automobile independently of rotation of said motor by said momentum, a storage tank for air from said compressor, a duct from said tank to said motor arranged and positioned whereby compressed air from said tank may be used to increase the charge of fuel supplied to the cylinders of said motor, and means controlled by the accelerator for said motor for rendering said compressor inoperative during acceleration of said automobile.

2. An automobile including an internal combustion motor, an air compressor adapted and arranged to be driven by the momentum of said automobile independently of rotation of said motor by said momentum, a storage tank for air from said compressor, a duct from said tank to said motor, a valve in said duct, an operative connection between said valve and the mechanism for opening the throttle valve of said motor from its normal closed position whereby said valve will be opened when said throttle valve is opened and compressed air from said tank will be used to increase the charge of fuel supplied to the cylinders of said motor, and means controlled by the accelerator for said motor for rendering said compressor inoperative during acceleration of said automobile.

3. An automobile including an internal combustion motor, an air compressor adapted and arranged to be driven by the momentum of said automobile independently of rotation of said motor by said momentum, a storage tank for air from said compressor, a duct from said tank to said motor, a valve in said duct, an operative connection between said valve and the mechanism for opening the throttle valve of said motor from its normal closed position whereby said valve will be opened when said throttle valve is opened and compressed air from said tank will be used to increase the charge of fuel supplied to the cylinders of said motor, and means for rendering said compressor inoperative when said valves are opened.

4. An automobile including an internal combustion motor, an air compressor having an operative connection with the drive shaft of said automobile whereby it will be driven by the momentum thereof independently of rotation of said motor by said momentum, a storage tank for air from said compressor, a duct from said tank to said motor, a valve in said duct and an operative connection between said valve and the mechanism for opening the throttle valve of said motor from its normal closed position whereby said valves will be opened simultaneously and compressed air from said tank will be used to increase the charge of fuel supplied to the cylinders of said motor, and means for rendering said compressor inoperative when said valves are opened.

MELVIN A. ROBLEE.